United States Patent [19]

Besson

[11] 4,186,322

[45] Jan. 29, 1980

[54] ELECTRIC ROTARY STEPPING MOTOR

[75] Inventor: Francis Besson, Savagnier, Switzerland

[73] Assignee: Girard-Perregaux S.A., Neuenburg, Switzerland

[21] Appl. No.: 859,599

[22] Filed: Dec. 12, 1977

[30] Foreign Application Priority Data

Dec. 22, 1976 [CH] Switzerland ....................... 16192/76

[51] Int. Cl.$^2$ ................................................ H02K 1/06

[52] U.S. Cl. ........................................ 310/194; 310/207; 58/23 D; 310/49 R

[58] Field of Search ............. 310/194, 46, 49, 40 MM, 310/207; 58/23 D

[56] References Cited

U.S. PATENT DOCUMENTS

| | | | |
|---|---|---|---|
| 2,499,326 | 2/1950 | O'Brien | 310/194 |
| 3,546,507 | 12/1970 | Wengel | 310/46 X |
| 3,652,884 | 3/1972 | Vuffray | 310/257 X |
| 3,747,320 | 7/1973 | Vuffray | 58/23 D |

FOREIGN PATENT DOCUMENTS

| | | |
|---|---|---|
| 1404480 | 5/1965 | France. |
| 2209246 | 6/1974 | France. |
| 533866 | 3/1973 | Switzerland. |

*Primary Examiner*—Donovan F. Duggan
*Attorney, Agent, or Firm*—Stevens, Davis, Miller & Mosher

[57] ABSTRACT

An electric rotary stepping motor intended for use in watch movements comprises a stator including a coil support coaxial with the rotor, two compact coils having flat turns, and a field-closing yoke capable of magnetically blocking the rotor in a position enabling it to start up in the desired direction. The motor is made more compact, and its manufacture and assembly are simplified, by designing the coil support with two diametrically opposed arms and the coils as self-supporting elements in which the turns of the windings are joined to one another.

8 Claims, 5 Drawing Figures

ELECTRIC ROTARY STEPPING MOTOR

Figure 1:
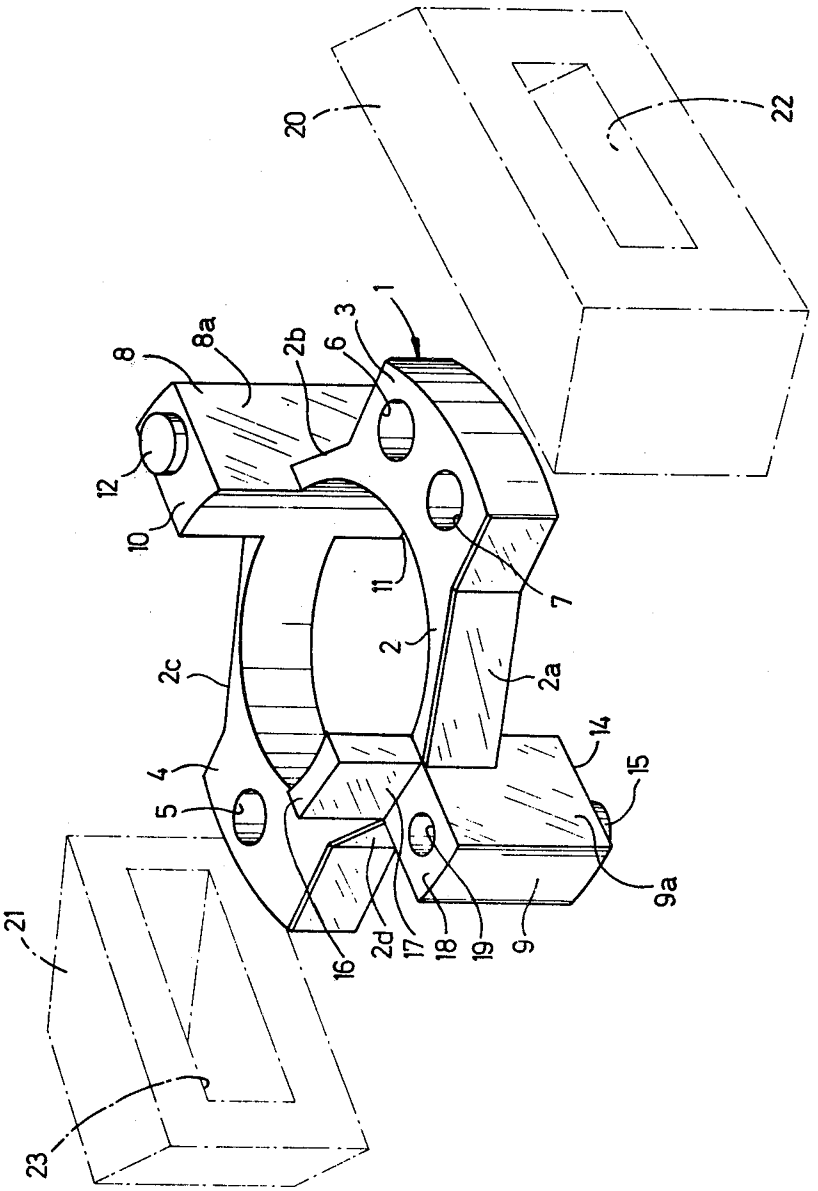

This invention relates to an electric rotary stepping motor for watch movements, of the type comprising a rotor, a one-piece coil support of a non-magnetic material, substantially cylindrical and disposed coaxially with the rotor, two compact coils having flat turns borne by the coil support, and a field-closing yoke made of a low-remanence material, disposed coaxially with the coil support and provided with magnetic rotor-blocking means.

Electric motors of this type are already known, particularly from Swiss Pat. No. 533,866. In comparison with other types of motors already proposed for driving the gear-trains of electric watch movements, they present the advantage that they can be produced in very small sizes, especially as regards the axial dimension, while still ensuring adequate reliability with a low enough current consumption to guarantee long battery life. Certain motors of this type are powered by current pulses of a frequency of 1 c/s, lasting about 23 msec, the current intensity during the pulses being on the order of 100 microamperes.

Other previously-known motors have also been proposed for timepieces, especially for wrist watches. They include coils in the form of thin disks. According to French Pat. No. 1,404,480, such coils, having a curved shape, are cemented to the inside surface of a field-closing cylinder. According to French Pat. No. 2,209,246, a stepping motor, rather than a continuous-drive motor as in French Pat. No. 1,404,480, comprises eight thin, flat, circular coils cemented on rings disposed facing one another.

However, these arrangements do not allow a sufficient degree of miniaturization to enable the production of wrist watches answering the practical requirements.

Experience and the teaching of Swiss Pat. No. 533,866 have shown that, on the contrary, the production of a motor capable of driving the gear-train of a wrist watch calls for a stepping operation in a design capable of supplying spaced current pulses, as well as for coils which are only two in number but which are compact coils having flat turns mounted on a coil support and closely encircling the rotor without touching it.

However, the production of coil supports and coils meeting these specifications presented various problems.

The aforementioned Swiss Pat. No. 533,866 discloses a coil support comprising one or two parts provided with steps or grooves, and the coils are formed by winding an insulated wire directly on the supports. Moreover, the coils are held between at least two parallel elements such as the sides of grooves made in the coil support, for example.

In this way, the seating of each coil on the coil support is ensured. Since the stator is provided with magnetic rotor-blocking means, the current pulse running through the coils must, during the time when the rotor is accelerating, exert upon the rotor sufficient torque to overcome the magnetic blocking torque and impart a rotary acceleration to the rotor. The reaction of this torque is exerted upon the turns of the coils and upon the connection means between the coils and the coil support. It has therefore been necessary until now to hold the coils on the inside and by their end faces by means of rigid, fixed elements. Despite these elements, however, it could happen that during winding, the inside turns of the coils would be subjected to traction stresses which stretched and deformed them so that these turns were liable to brush against the rotor during operation.

It is an object of this invention to provide an improved motor of the type initially mentioned in order to overcome the foregoing drawbacks, and especially to free the designer of the obligation which has existed heretofore of winding each coil directly on the coil support and holding the coils between fixed side elements.

To this end, in the improved motor according to the present invention, of the type initially mentioned, the coil support is provided with two diametrically opposed arms, and the coils are self-supporting elements formed of turns which are joined to one another, each of these elements being disposed on one of the arms and adhesively secured thereto.

In a preferred embodiment of the invention, the inner turns of the coils follow a path forming an irregular octagon at least in the region closest to the axis of the motor, these inner turns being more greatly compressed at the center than at the ends thereof.

Since the dimensions of a coil formed of insulated copper wire must necessarily have relatively wide tolerances, this arrangement makes it possible to contrive additional space in the parts of the coils which are near the rotor, and particularly at the locations where the means for securing the cylindrical magnet to its shaft are situated. Thus several hundredths of a millimeter can be saved on the axial thickness of the motor, enabling the production of electronic watches, and especially quartz watches, which are thinner than has been possible until now.

The invention is based upon the fact, which unexpectedly came to light during the course of research, that by using extremely fine copper wire having thermoadhesive insulation, it proved possible to make up coils in the form of rigid elements capable of imparting sufficient rotary torque to the rotor while still having a small enough cross-section of copper to remain within the maximum dimensions specified for the motor.

Figure 2:
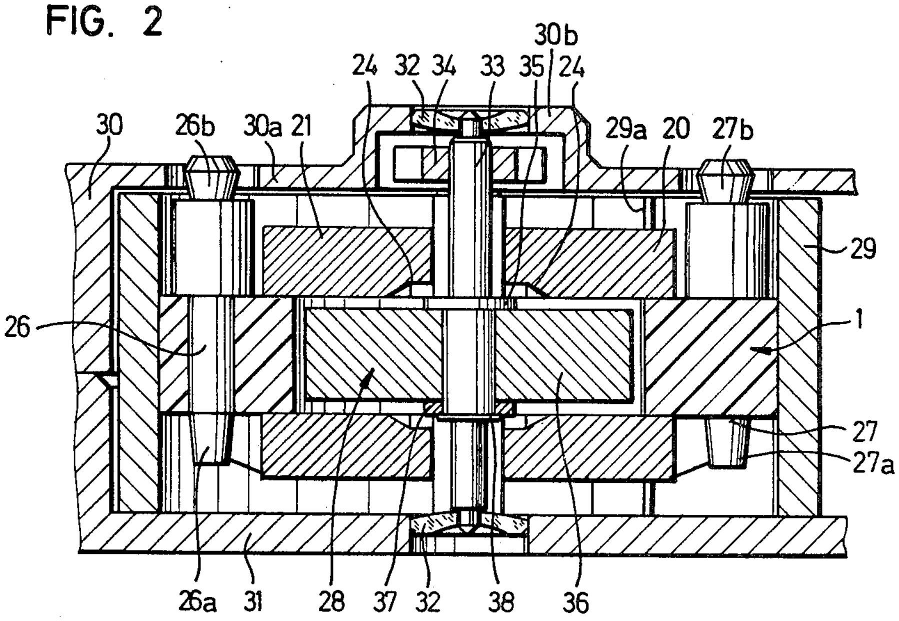
Figure 3:
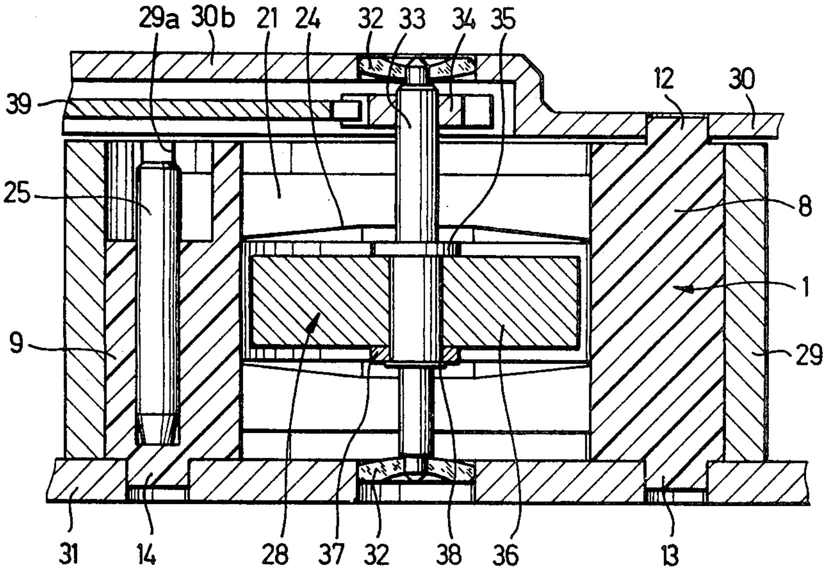
Figure 4:
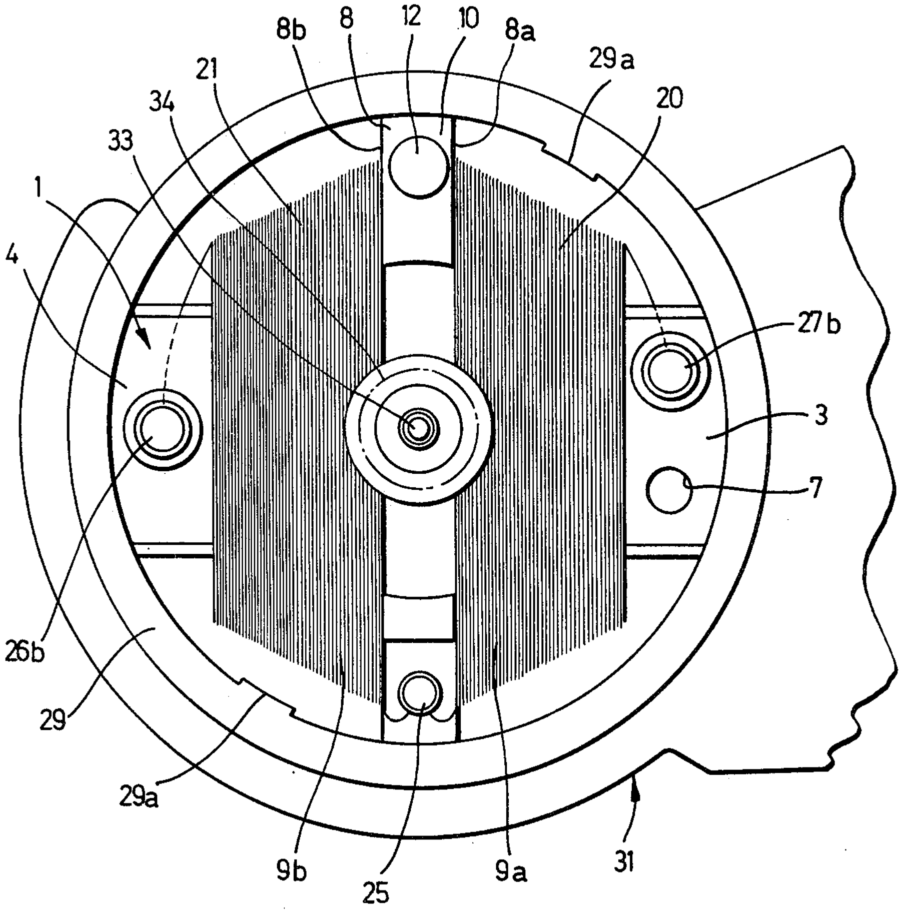
Figure 5:
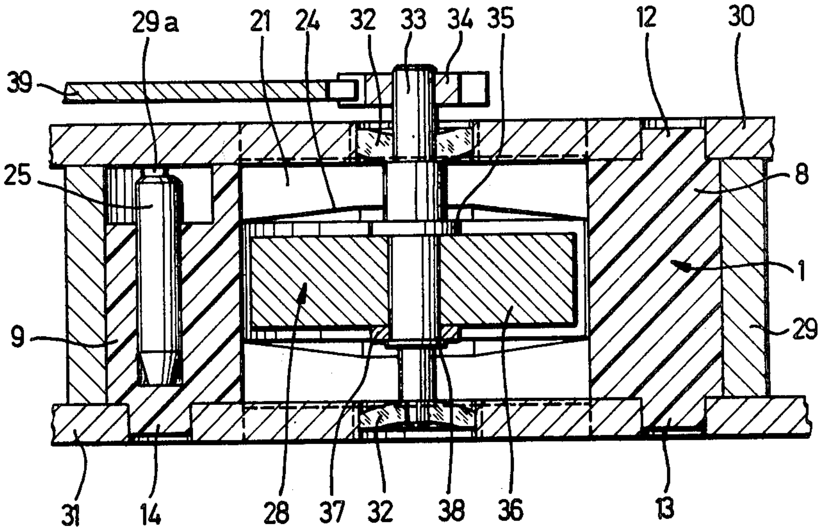

A preferred embodiment of the invention, as well as several modifications thereof, will now be described in detail with reference to the accompanying drawings, in which:

FIG. 1 is a diagrammatic perspective view showing the coil support and the two coils separated from the form, FIG. 2 is a sectional view of the motor on a plane containing the axis of the rotor and intersecting the coils perpendicularly at the windings, FIG. 3 is a sectional view through the axis of the rotor along a plane parallel to the planes of the turns, FIG. 4 is a top plan view of the motor unit with the upper bridge removed, and FIG. 5 is a view analogous to that of FIG. 3, showing a modification.

The simplification in the design of electric rotary stepping motors, brought about by the arrangement about to be described, derives essentially from the design of the coil support and the disposition of the coils. The coil support is the part designated by reference numeral 1 in FIG. 1. This part may be produced by molding and injection of plastic material or by sintering of some other non-magnetic material, e.g., a ceramic material. The coil form 1 is of a generally annular shape.

Its various elements comprise a circular ring 2 having a cylindrical inside surface, two diametrically opposed securing arms 3 and 4 extending from and having the same thickness as ring 2, and two pillars 8 and 9. Ring 2 and arms 3 and 4 are bounded by two parallel plane faces, perpendicular to the axis of the circular opening of ring 2. This opening is slightly larger in diameter than a rotor 28 to be described below. Arm 4 has a cylindrical bore 5 at the end, while arm 3 includes two bores 6 and 7 having the same dimensions as bore 5. The axes of these bores are parallel to that of ring 2.

Pillars 8 and 9 are projecting elements, parallel to the axis of the motor and situated at two diametrically opposed locations on ring 2. Each of the pillars 8 and 9 is symmetrical with respect to a plane perpendicular to the longitudinal plane of symmetry of arms 3 and 4 and containing the axis of the motor. Pillar 8 extends parallel to the axis of ring 2, upwardly and downwardly beyond the plane surfaces which determine the thickness of ring 2 and of arms 3 and 4. Pillar 8 is bounded by two plane surfaces 10 and 11, from which project studs 12 and 13, respectively (stud 13 being visible in FIG. 3).

Pillar 9 extends downward with a cross-section equal to that of pillar 8 and is bounded by a plane surface 14 and a stud 15, whereas beyond the upper plane surface of ring 2, the cross-section of pillar 9 is reduced. It is bounded by a flat face 16 situated at the same level as the surface 10 but without any stud. Instead, a step 17 forms, at the level of the upper surface of ring 2, a shoulder 18 in which there is a bore 19 parallel to the axis of ring 2.

Pillars 8 and 9 also have two respective pairs of flat faces 8*a*, 8*b*, and 9*a*, 9*b* against which the coils rest, as will be seen below.

Ring 2 is outwardly bounded by four plane, oblique surfaces, viz, faces 2*a* and 2*b* extending between pillars 8, 9 and arm 3, and faces 2*c* and 2*d* extending between pillars 8, 9 and arm 4.

Two coils 20 and 21 are shown in dot-dash lines in FIG. 1. It will be seen that they are self-supporting elements in the form of trapezoidal-based prisms, each having a central passage 22, 23, the shape and orientation of which are the same as that of the prismatic body itself. Coils 20 and 21 are produced by winding a very fine copper wire, having thermoadhesive insulation, on a core having the exact shape of passages 22, 23. Winding is carried out by causing the core to rotate about its own axis while keeping it at a temperature sufficient to soften the insulation slightly. When this winding operation is properly carried out, the result is a winding in which the turns are contained in planes perpendicular to the axis of rotation of the core. The shape of the coils may be selected at will within wide limits by selecting the shape of the core and the winding conditions. Thus the coils may be adapted under the best possible conditions to the available space.

The exact shape of coils 20 and 21 is shown in FIG. 2, where they are viewed in section on a plane perpendicular to the plane of the turns. It will be seen that in the vicinity of the closest plane to the axis of rotor 28, each coil exhibits a step forming an inner recess 24. Normally, a projection in the flat upper and lower faces of coils 20 and 21 ought to correspond to recess 24; but as a result of a hardening treatment and of the equalization produced in the upper layers, this projection disappears, and the end faces of coils 20 and 21 are substantially plane and parallel.

In the embodiment illustrated in the drawings, the shape of the core is such that the inner turns of the coils exhibit, in the parts facing the rotor, an outline corresponding to an irregular octagon, as may be seen in FIG. 3, where coil 21 is viewed from the front and where the path of the inner turn corresponds to the inside contour of the coil itself. Thus the frontal portions of the turns are more compressed in the center than at the end regions thereof. Experience has shown that this result may be obtained by winding uniformly on a core which corresponds in shape to the inner contours of the coils, and that the effect of compression obtained in the central regions of the frontal portions of the turns makes it possible to produce self-supporting coil elements without any risk of internal short-circuiting.

After winding and treatment, coils 20 and 21 are identical; consequently, they may be wound in succession on the same core. Each coil has two free ends of wire. After rotor 28 has been inserted in the opening of ring 2, coils 20 and 21 are fitted on arms 3 and 4, respectively, where the inside faces of passages 22 and 23 lie against faces 2*a*, 2*b* and 2*c*, 2*d*, respectively. Coils 20 and 21 may be secured to support 1, and especially to the faces of arms 3 and 4, by spots of cement, after which these parts are ready to be assembled with the rest of the motor.

First, the two windings of coils 20 and 21 are connected in series. For this purpose, one end of the wire of each coil is soldered to a metal connecting pin 25 which is inserted and secured in bore 19. The other ends of the wires of coils 20 and 21 are respectively soldered to the lower ends 26*a*, 27*a* of terminals 26 and 27 which are inserted and secured in bore 5 and in one of the bores 6 or 7, respectively. Two symmetrical bores 6 and 7 are provided in securing arm 3 because, according to the watch caliber in which the motor is intended to be fitted, it is preferable that terminal 27 be on either one side or the other of the plane of symmetry passing through the axis of rotor 28 and the middle of arms 3 and 4, this plane of symmetry being perpendicular to the plane of the turns of the winding. Therefore, terminal 27 is inserted in whichever bore is suitable according to the intended caliber, and the corresponding end of the winding is soldered to the frustoconical lower end 27*a*.

Rotor 28 is a unit which is very easy to assemble. A steel shaft 33, which may be produced by lathe-turning, bears a pinion 34 driven on near the upper pivot. About halfway along the length of shaft 33 is a collar 35 against which a permanent magnet 36 rests. The latter is a cylindrical part having a central aperture which fits on a cylindrical bearing surface of shaft 33 adjacent to collar 35. Magnet 36 is secured on shaft 33 by means of a lock washer 37 fitted on the aforementioned bearing surface and held by a rivet head 38 formed on shaft 33. Lock washer 37 absorbs the stresses during riveting of magnet 36.

The assembly comprising coil support 1, coils 20 and 21, and rotor 28 is then fitted into a cylindrical yoke 29 taking the form of a ring made of low-remanence, high-permeability ferromagnetic material. Yoke 29, which is designed to bring about the closing of the field, on the one hand, and magnetic blocking of rotor 28 between pulses, on the other hand, includes two diametrically opposed inner ribs 29*a* oriented at 30° with respect to the plane of symmetry parallel to the plane of the turns of coils 20 and 21.

After coil form 1 has been fitted within yoke 29, the active parts of the motor may be put in place between two bridges 30 and 31 carrying bearings 32 which are fitted in coaxial openings and are intended to receive the ends of shaft 33. Bridges 30 and 31 are secured to one another so as to constitute a motor module. As may be seen in FIG. 3, stud 12 of coil form 1 fits into an opening in upper bridge 30, while studs 13 and 14 of pillar 8 and pillar 9 fit into corresponding openings in lower bridge 31. Thus coil form 1 is fixed with respect to the modular unit. As may be seen in FIG. 2, heads **26*b* and 27*b* of terminals 26 and 27 are situated between yoke 29 and coils 20 and 21** and are intended to be connected to current-feed wires which are provided with plug-in contacts and borne by a printed circuit of an electronic unit.

As shown in FIGS. 2 and 3, bridge 30 exhibits a step delimiting a first portion **30*a* forming a base and a second portion 30*b* which carries bearing 32 and is farther than portion 30*a* from bridge 31. Pinion 34 is accommodated in the break of continuity and meshes with a wheel 39 of the first wheel-and-pinion of a reduction gear-train. Wheel 39 is integral with a shaft (not shown) which, in a particularly preferred embodiment, can pivot in portion 30*b* of bridge 30**. This arrangement contributes to the reliability of the movement by avoiding inaccuracies in the distances between the bearings.

It follows from the preceding description that the design described is particularly snug and compact. Coils 20 and 21 are completely contained within the space bounded by yoke 29 between bridges 30 and 31.

In a modification of the embodiment (FIG. 5), the total height of the motor might be still further reduced by the thickness of bridges 30 and 31. For this purpose, these bridges include cut-outs having an outline approximately the shape of the trapezoidal cross-section of coils 20 and 21 so that the latter can fit into these openings. This arrangement, combined with a reduction in the height of yoke 29 and a reduction in the size of the coil heads by compression of their turns in planes perpendicular to the axis, makes it possible to reduce the distance between bridges 30 and 31 and, consequently, to reduce the height of the motor module. In this case, pinion 34 is suspended at the end of shaft 33, and bearings 32 are situated within the limits of the windings of coils 20 and 21, in recesses formed by compression of the turns at the time of winding. This reduction in the height of the motor module likewise makes it possible to reduce the total thickness of the movement. The production of coils having inner recesses makes it possible to concentrate the active sections of copper very close to the rotor and to give them maximum extension within the overall limits, as reduced as possible, for the motor module, while still ensuring the desired axial clearance for the rotor.

Terminals 26 and 27 and connection pin 25 will preferably be of gilt brass.

The design described makes it possible to produce a motor about 6 mm in diameter and less than 4 mm thick, capable of driving the gear-train and indicator members of a a calendar wristwatch with hands, including a jumping seconds-hand, and also with day and date indications. The current consumption is on the order of 3 microamperes. When produced with cut-outs in the bridges to accommodate the coil heads, the overall height of the motor is such that it allows production of a movement for an electronic quartz wristwatch with hands, which movement is appreciably thinner than the extra-thin movements known heretofore.

What is claimed is:

1. An electric rotor stepping motor for a watch movement comprising two frame elements, two coaxial bearings each borne by each of said frame elements, a rotor pivotally mounted between said bearings, a one-piece coil support of a non-magnetic material, surrounding said rotor, two compact coils having flat turns, borne by said coil support, and a field-closing yoke made of a low-remanence material, disposed coaxially with said coil support and provided with magnetic rotor blocking means, wherein said coil support comprises a ring-shaped portion, at least three axially projecting portions arranged in a same diametrical plane, and two diametrically opposed projecting arms perpendicular to said plane and having a cross-section decreasing away from said ring-shaped portion, said projecting portions engaging both said frame elements, thus holding said coil support between said frame elements, and said coils are self-supporting elements formed of turns which are joined to one another, each of said coil elements engaging one of said arms and being adhesively secured thereto.

2. The motor of claim 1, wherein the inner said turns of said coils follow a path forming an irregular octagon at least in the region closest to the axis of said motor, said inner turns being more greatly compressed at the center than at the ends thereof.

3. The motor of claim 2, wherein said rotor comprises a cylindrical magnet having transverse magnetization and a central aperture, a shaft disposed in said aperture and having a collar, and a lock washer, said magnet being fitted on said shaft and held between said collar and said lock washer, and said collar and said lock washer being accommodated in spaces left free by said path forming an irregular octagon followed by said inner turns of said coils.

4. The motor of claim 1, wherein said rotor comprises a cylindrical magnet forming the active portion thereof and said coil support comprises a continuous cylindrical passage surrounding said magnet, each of said arms of said coil support being bounded by two plane, parallel frontal faces perpendicular to the axis of said motor, said passage opening out into said faces.

5. The motor of claim 1, wherein each of said arms comprises a first portion nearest the axis of said motor and having a trapezoidal shape, and a second portion more remote from said axis, having a rectangular shape, projecting away from said coils, and ensuring the centering of said yoke.

6. The motor of claim 1, wherein said coil support bears two power-supply terminals and a connecting terminal, each of said power-supply terminals being connected to a respective end of one of said coils, and said connecting terminal being connected to the other ends of each of said coils.

7. The motor of claim 1, wherein said two frame elements each comprise thickened portions situated outside the perimeter of said yoke and secured to one another.

8. The motor of claim 1, further comprising two power-supply terminals having heads, two bridges joined to form a module, and a shaft pivoted between said two bridges, said rotor being mounted on said shaft, said bridges including cut-out apertures, and said coils and said heads being at least partially disposed in said apertures.

* * * * *